Feb. 4, 1930.  V. LINK  1,745,700
INTERNAL COMBUSTION ENGINE
Filed Jan. 5, 1927
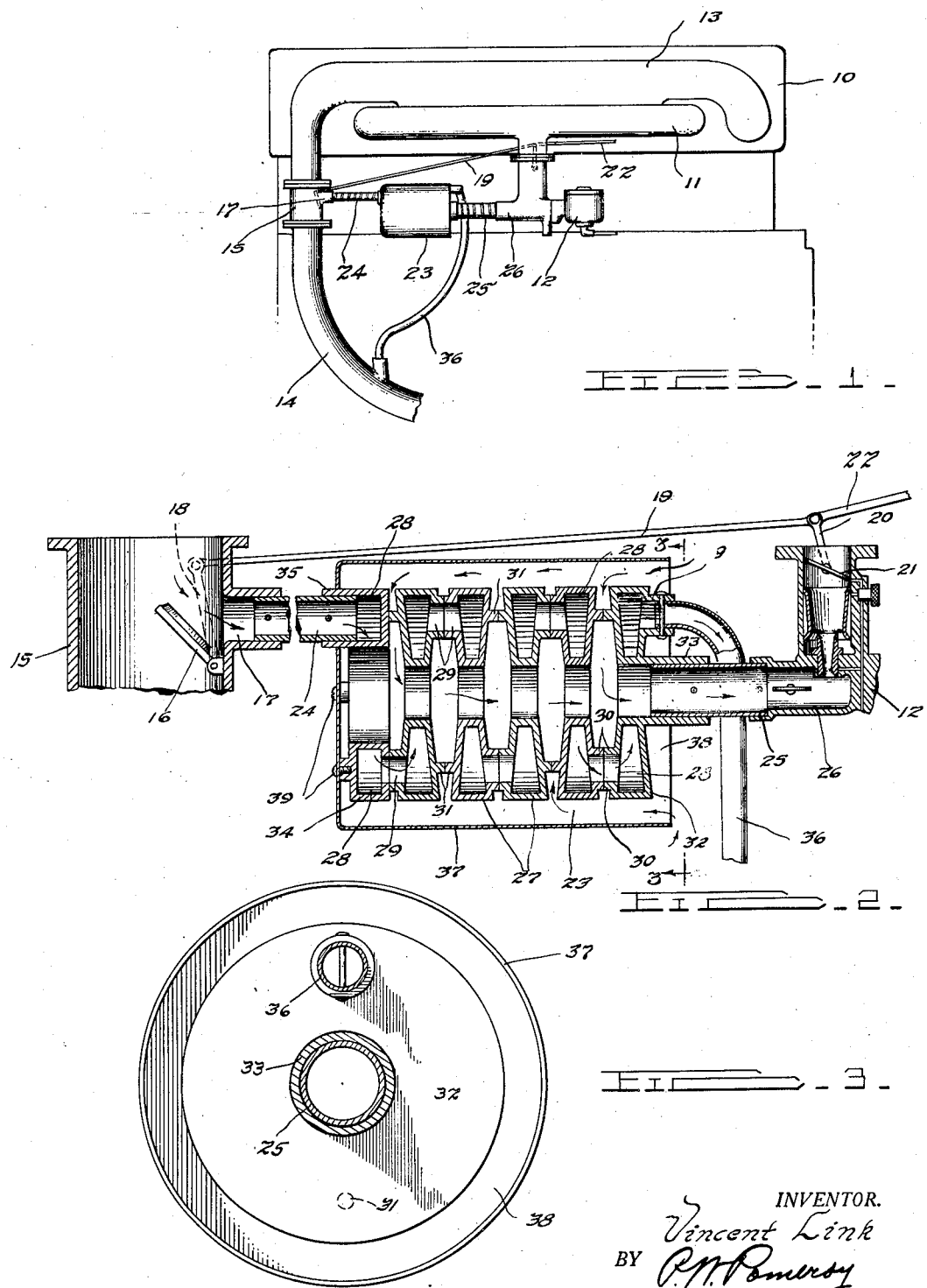
INVENTOR.
Vincent Link
BY
ATTORNEY Patented Feb. 4, 1930

1,745,700

UNITED STATES PATENT OFFICE

VINCENT LINK, OF DETROIT, MICHIGAN, ASSIGNOR TO THE STUDEBAKER CORPORATION, OF SOUTH BEND, INDIANA, A CORPORATION OF NEW JERSEY

INTERNAL-COMBUSTION ENGINE

Application filed January 5, 1927. Serial No. 159,136.

This invention relates to internal combustion engines, and particularly to heating devices therefor, wherein means is provided to heat the intake air previous to its entrance into the carburetor.

The principal object of the present invention is to provide an internal combustion enthen is drawn into the carburetor 12 through air to the carburetor under conditions which will permit the engine to operate most efficiently.

Another object is to provide an internal combustion engine with a heater for heating the incoming air to the carburetor to assist the engine in maintaining a good operating temperature, particularly at slow speeds, the temperature of the heater being automatically controlled by the speed of the engine.

Another object is provide an internal combustion engine with a heater for the air intake of the carburetor, the carburetor having a throttle valve for admitting gas mixtures into the engine manifold, which valve simultaneously operates a valve for permitting exhaust gas to enter the heater.

A further object is to provide a heater for regulating the temperature of the air entering an engine carburetor to provide more efficient carburization, said heater comprising a shell open at one end and having a plurality of hollow annular rings contained therein, the adjacent rings being interconnected to allow exhaust gas to pass therethrough to heat the same, the air entering the carburetor being drawn through the open end of the shell and between the heated rings into the carburetor inlet.

These being among the objects of the present invention, the same consists of certain features of construction and combinations of parts to be hereinafter described with reference to the accompanying drawing and then claimed, having the above and other objects in view.

Referring now to the accompanying drawing which illustrates a suitable embodiment of the present invention, Figure 1 is a side elevational view of an internal combustion engine having the heater of the present invention connected at its ends to the carburetor and exhaust manifold.

Figure 2 is a longitudinal section of the heater, coupling and a portion of the carburetor showing the passage of exhaust gas through the heater, and the passage of the intake air to the carburetor.

Figure 3 is an enlarged section taken approximately on the line 3—3 of Figure 2 showing an end view of the heater, the exhaust pipe for the heater being in section.

Heretofore, internal combustion engines provided with means for heating the intake air generally employed a heater of the "muff" type which embodied, principally, a hood surrounding a portion of the exhaust pipe which was connected directly to the carburetor intake tube.

After an engine using a construction of this type was warmed up, the temperature of the intake air increased with the speed of the engine, because the exhaust pipe became hotter as the speed of the engine increased. These prior constructions were not satisfactory as it is a well known fact that an internal combustion engine will operate more efficiently and economically if the heat supplied to the intake air is lessened as the speed of the engine is increased, and also, that at low speeds an engine will operate more efficiently and economically when the intake air is properly heated to provide a correct carburized mixture.

In the present invention, a device is provided for heating the intake air which is adapted to be controlled by the carburetor throttle valve, whereby the exhaust gas may be gradually shut out of the heater as the throttle valve opens to increase the speed of the engine.

In the accompanying drawing, in which like numerals refer to like parts throughout the several views, an internal combustion engine 10 is illustrated as having an intake manifold 11 of the conventional type for the passage of a combustible mixture from the carburetor 12 to the combustion chambers of the engine cylinders. A conventional exhaust manifold 13 is provided to conduct the exhaust gases from the combustion chambers to the atmosphere through an exhaust pipe 14. The exhaust pipe 14 is connected to the exhaust manifold 13 by a coupling 15 containing a flap valve 16 adapted to open and close an outlet duct 17 leading to the heater. This valve 16 is operated by means of a lever 18 which is actuated by a rod 19 connected with a similar lever 20 which operates the carburetor throttle valve 21, all of the mechanism being operated by the manually operated accelerator rod 22.

The heater 23 is interposed between the coupling 15 and the carburetor 12, it being connected at one end with the outlet duct 17 of the coupling 15 by the tube 24, and at the opposite end thereof with the intake pipe 26 of the carburetor 12 by the tube 25.

As shown in Figures 2 and 3, the heater 23 comprises a plurality of hollow annular heating rings 27 connected together to provide a continuous passage of exhaust gases therethrough. Each ring 27 is cast from suitable material and its inner circumference is of lesser width than the outer circumference to provide a ring which is substantially triangular shaped in cross section, and is formed with a continuous passageway 28 therein. The rings 27 are connected in a manner so that the passageways 28 have communication through radially opposed ports 29 on opposite sides of the rings 27, which rings 27 are held in spaced position by the walls 30 of the ports 29 and bosses 31 positioned in opposed relation to the ports 29. The end ring 32 adjacent the carburetor 12 is cast with a central cylindrical portion 33 extending outwardly therefrom which receives the end of the tube 25, through which the heated air passes into the carburetor 12. The ring 34 at the opposite end of the heater is formed with a bossed opening 35 which receives the tube 24 to effect a continuous passage of the exhaust gas from the coupling 15 through the heating rings 34, 27, and 32 and out through the port 29 into a tubular member 36, connected with the exhaust pipe 14. Surrounding these heating rings 27 is a casing 37 having an open end 38 which is secured to the end ring 34 by screws 39, and having its walls spaced away from the circumferential walls of the heating rings 27.

From the foregoing description, the construction of the heater should be apparent and its operation will now be described.

When the engine 10 is running at slow speed, the throttle valve 21 is partially open and being connected to the flap valve 16 in the coupling 15, causes the valve 16 to remain open to direct the hot exhaust gases into the tube 24. The hot gases pass from the tube 24 into the end ring 34 and successively pass through the passages 28 in rings 27 and ring 32, and into the exhaust pipe 14 through the tubular member 36. The travel of the gases through the heater causes the rings 27 to heat up so that they can impart heat to the air which is being drawn into the carburetor intake pipe 26.

In Figure 2 the travel of the intake air is indicated by the arrows and is shown as entering the heater 23 through the open end 38 of the casing 37 where it is sucked in between the spaced heating rings 27 and into the extending portion 33 of the ring 32 and then is drawn into the carburetor 12 through its intake pipe 26. It is obvious that as the throttle valve 21 is opened to admit more fuel to the engine, the flap valve 16 closes, and less exhaust gas will be directed into the heater 23. When the valve 21 is entirely open to cause the engine to run at maximum speed the valve 16 is closed and no exhaust gas enters the heater. This operation of the heater through the governing valve 16 connected to the throttle valve 21, provides a regulating means whereby the intake air may be heated to a temperature best suited for the different speeds of an engine, and the maximum efficiency and economy may be obtained through perfectly carburized combustible mixtures.

Although the heat controlling valve 16 is shown to be so connected with the throttle valve 21 that it will be entirely closed when the valve 21 is in maximum open position, it is to be understood that it may be arranged to be in partly open position, when the valve 21 is in maximum open position, and also, that it may be arranged to be partly closed when the throttle valve 21 is practically closed, whereby the heat may be shut off at some point before the throttle valve 21 reaches its maximum open position.

Formal changes may be made in the specific embodiment of the invention described without departing from the spirit and substance of the broad invention the scope of which is commensurate with the appended claims.

What I claim is:

1. In an internal combustion engine, a heater for controlling the temperature of the air entering the engine carburetor comprising a plurality of spaced hollow annular rings interconnected to provide a continuous passageway therethrough, an open-ended shell surrounding said rings for directing air into the spaces between said rings, a duct connected with the central opening of one of said rings and the intake of said carburetor for conducting said air to said carburetor, and a duct connected at one end to the exhaust of said engine for directing a heating medium into said passageway to heat said rings, said rings radiating heat to heat said air entering said carburetor.

2. In an internal combustion engine, a heater for controlling the temperature of the air entering the engine carburetor comprising a plurality of spaced hollow annular rings interconnected to provide a continuous passageway therethrough, a shell open at one end surrounding said rings for directing air therebetween, a duct connected at one end to the exhaust of said engine for passing a heating medium into said passageway for heating said rings, a valve for controlling the amount of heating medium entering said passageway, and a duct connected with the central opening of one of said rings and said carburetor for conducting air heated by said rings into said carburetor.

3. In a device of the class described, an air heater comprising a plurality of spaced hollow annular rings having diametrically opposed ports at opposite sides thereof, said rings being positioned with the ports of one ring connected with the ports of adjacent rings to provide a continuous passageway therethrough, means for admitting a heating medium into said passageway for heating said rings, a ported shell surrounding said rings for deflecting cold air into the spaces between said rings and through the central openings thereof, and a duct connected with one of said central openings for discharging said air heated by the contact with said heated rings.

4. In an internal combustion engine, an air heater positioned between the exhaust manifold and the carburetor comprising a plurality of rings having central openings to permit circulation of cold air therethrough, annular passageways therein and ports connecting said passageways to provide a continuous passageway therethrough to permit circulation of a heating medium, means for deflecting cold air around said rings and through said central openings, and means for admitting hot exhaust gases from said manifold into said passageway and discharging the same therefrom, said hot exhaust gases heating the cold air as it passes around said rings and through the central openings therein.

5. In an internal combustion engine, means for heating the air entering the engine carburetor comprising a plurality of spaced hollow angular rings connected together to provide a continuous passageway therethrough, means for directing the air into the spaces between said rings, means connecting the central transverse opening in one of said rings with said carburetor for directing air into said carburetor, and means connected with the exhaust of said engine for directing heat into said passageway continuous for heating the rings to heat said air.

Signed by me at Detroit, Michigan, this 30th day of December 1926.

VINCENT LINK.

CERTIFICATE OF CORRECTION.

Patent No. 1,745,700.  Granted February 4, 1930, to

VINCENT LINK.

It is hereby certified that error appears in the printed specification of the above numbered patent requiring correction as follows: Page 1, line 8, strike out the words "then is drawn into the carburetor 12 through" and insert instead the syllable and words "gine with a device for heating the incoming"; and that the said Letters Patent should be read with this correction therein that the same may conform to the record of the case in the Patent Office.

Signed and sealed this 18th day of March, A. D. 1930.

(Seal)

M. J. Moore,
Acting Commissioner of Patents.